United States Patent
Martis

Patent Number: 5,395,460
Date of Patent: Mar. 7, 1995

[54] HARMONIC MARKERS MADE FROM FE-NI BASED SOFT MAGNETIC ALLOYS HAVING NANOCRYSTALLINE STRUCTURE

[75] Inventor: Ronald J. Martis, East Hanover, N.J.

[73] Assignee: AlliedSignal Inc., Morris Township, Morris County, N.J.

[21] Appl. No.: 962,638

[22] Filed: Oct. 16, 1992

[51] Int. Cl.⁶ .............................................. H01F 1/00
[52] U.S. Cl. .................................. 148/121; 148/108; 148/122
[58] Field of Search ..................... 148/108, 121, 122

[56] References Cited

U.S. PATENT DOCUMENTS

| | | | |
|---|---|---|---|
| 4,221,257 | 9/1980 | Narasimhan | 164/87 |
| 4,945,339 | 7/1990 | Yamauchi et al. | 340/551 |
| 5,313,192 | 5/1994 | Ho et al. | 340/551 |

FOREIGN PATENT DOCUMENTS 58-58707  4/1983  Japan .................. 148/121

OTHER PUBLICATIONS

U.S. patent application Ser. No. 896,505 filed on Jun. 2, 1992.

Primary Examiner—John P. Sheehan
Attorney, Agent, or Firm—Ernest D. Buff; Melanie L. Brown

[57] ABSTRACT

The present invention discloses a process for enhancing the harmonic output of a marker comprising the steps of providing an amorphous alloy having a composition $(Fe_{1-x}Ni_x)_aM_b(B_{1-y}Si_y)_c$ wherein "x" ranges from about 0.2 to about 0.9, "y" ranges from 0 up to about 0.5, "a" is between about 60 and about 90 atomic %, "b" is between about 0.1 to about 10 atomic %, "c" is between about 0.1 to about 30 atomic percent, and M is at least one metal selected from the group consisting of Mo, Cr, Hf, Nb, Ta, Ti, V, W, and Zr, the amorphous alloy having at least two crystallization temperatures, a first crystallization temperature at which a nanocrystalline phase is formed, and a second crystallization temperature at which a second crystalline phase is formed; annealing the amorphous alloy at a temperature between the first and the second crystallization temperatures for a time sufficient to increase at least one harmonic characteristic of the element. Harmonic markers produced thereby are also disclosed.

14 Claims, 1 Drawing Sheet

HARMONIC MARKERS MADE FROM FE-NI BASED SOFT MAGNETIC ALLOYS HAVING NANOCRYSTALLINE STRUCTURE

FIELD OF THE INVENTION

The electronic article surveillance art continues to look for new alloys which display good harmonic properties. Applicants have unexpectedly found that by annealing alloys having the composition $(Fe_{1-x}Ni_x)_aM_b(B_{1-y}Si_y)_c$ wherein "x" ranges from about 0.2 to about 0.9, "y" ranges from 0 up to about 0.5, "a" is between about 60 and about 90 atomic %, "b" is between about 0.1 to about 10 atomic %, "c" is between about 0.1 to about 30 atomic percent, and M is at least one metal selected from the group consisting of Mo, Cr, Hf, Nb, Ta, Ti, V, W, and Zr between a first and second crystallization temperatures, harmonic outputs which are as much as 100% greater than harmonic outputs of alloys which have not been so annealed may be produced. The desireable harmonic properties are produced without the addition of Cu via single step anneal performed within a narrow range of annealing conditions.

DESCRIPTION OF THE PRIOR ART

U.S. Pat. No. 4,945,339 discloses anti-theft markers formed from Fe—Co or Fe—Ni base alloys containing 0.1 to 3.0 atomic percent Cu, and 0.1–30 atomic percent of at least one element from the group Nb, W, Ta, Zr, Hf, V, Cr, Ti and Mo, and containing crystallites with an average particle size of 100 nm or less. The Fe—Ni and Fe—Co based soft magnetic alloys are annealed within a temperature range between 450° C. and 700° C. higher than the crystallization temperature and within a time range between 5 minutes and 24 hours. The addition of copper, which is not soluble in Fe, is required to provide nucleation sites for the formation of nanocrystallites.

U.S. patent application Ser. No. 896,505 filed on Jun. 2, 1992 discloses alloys having the general composition $(Fe_{1-x}Ni_x)_{60-90}Mo_{0.1-10}(B_{1-y}Si_y)_{0.1-30}$ where "a" through "c" are atomic percent, and the sum of "a" through "c" plus impurities is essentially 100. The quantity "x" ranges from about 0.2 to about 0.9, and the quantity "y" ranges from 0 to 0.5. In the first step the alloy is annealed at a temperature below the onset of the second crystallization temperature. After the first step of the anneal, the nanocrystalline alloy is cooled to the second annealing temperature in about one half hour. The second step of the anneal may be carried out within 50° C. of, and preferably just below, the Curie temperature of either the second magnetic phase, or the nanocrystalline phase and lasts for up to about 2 hours. The resulting alloy is disclosed as having good magnetic properties useful for amorphous alloy cores.

SUMMARY OF THE INVENTION

The invention relates to marker for harmonic electronic surveillance systems and to a process for making said marker comprising the steps of providing an amorphous alloy having a composition $(Fe_{1-x}Ni_x)_aM_b(B_{1-y}Si_y)_c$ wherein "x" ranges from about 0.2 to about 0.9, "y" ranges from 0 up to about 0.5, "a" ranges from about 60 to about 90 atomic %, "b" ranges from about 0.1 to about 10 atomic %, "c", ranges from about 0.1 to about 30 atomic percent, and M is at least one metal selected from the group consisting of Mo, Cr, Hf, Nb, Ta, Ti, V, W, and Zr, the amorphous alloy having at least two crystallization temperatures, a first crystallization temperature at which a nanocrystalline phase is formed, and a second crystallization temperature at which a second crystalline phase is formed; and annealing the amorphous alloy at a temperature between the first and second crystallization temperatures for a time sufficient to increase at least one harmonic characteristic of the amorphous alloy.

The markers of the present invention display greatly improved signal output compared to markers of the same material which have not been annealed according to the present invention. Harmonic markers which are annealed accordingly display outputs which are 100% higher than markers made from the same material which have not been so annealed.

DETAILED DESCRIPTION OF THE INVENTION

Figure 1:
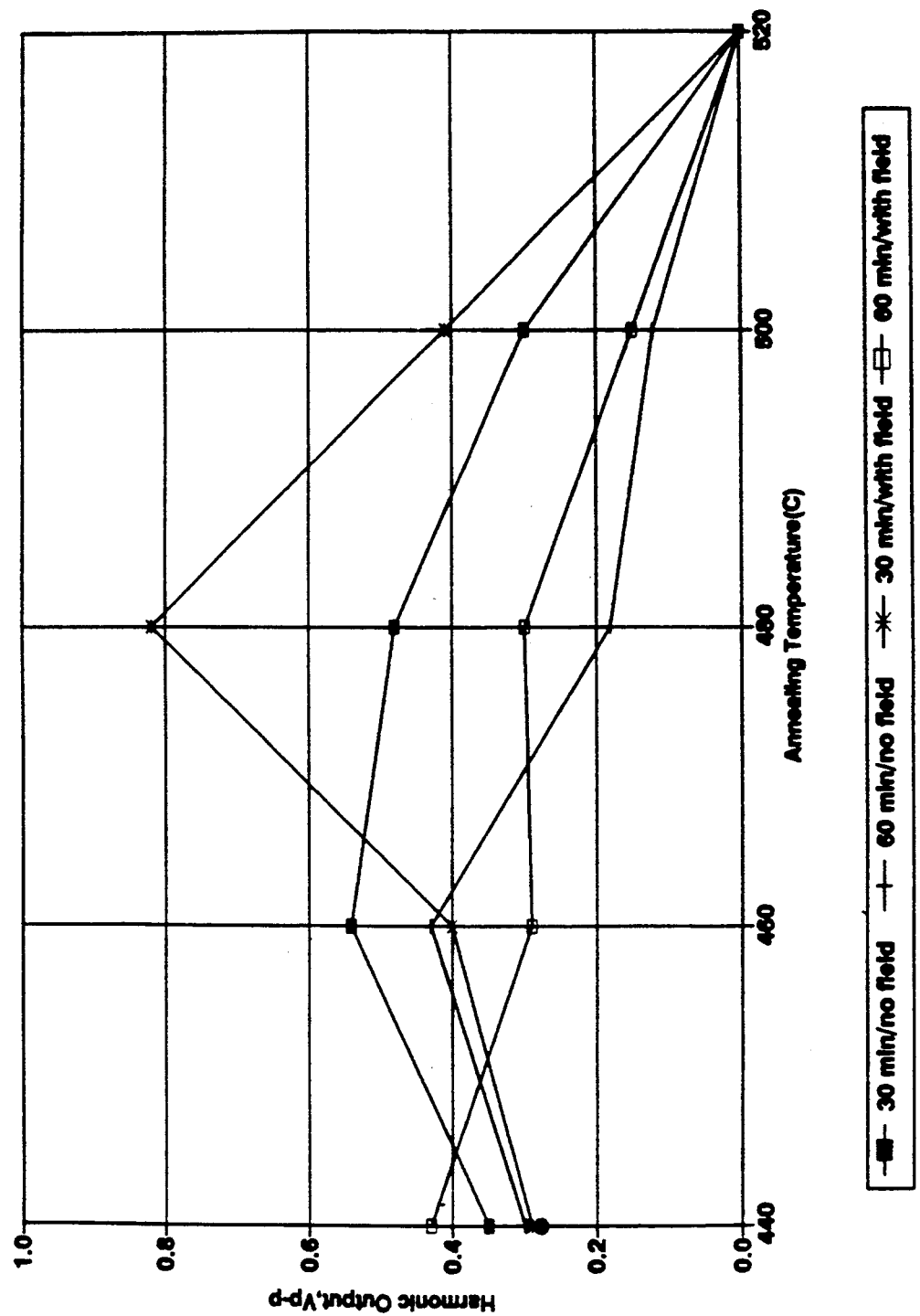
FIG. 1 is a graph showing the output Voltage (peak to peak) measured against the annealing temperature for an unannealed marker and for markers annealed for 30 and 60 minutes in a 10 Oe longitudinal field and in the absence of an applied magnetic field.

The alloys utilized in the production of the magnetic materials of the present invention are represented by the general formula:

$$(Fe_{1-x}Ni_x)_aM_b(B_{1-y}Si_y)_c$$

where "a" through "c" are atomic percent, and the sum of "a" through "c" plus impurities is essentially 100. The quantity "x" ranges from about 0.2 to about 0.9, and preferably is between about 0.48 and about 0.9. The atomic percentage of Fe—Ni represented by "a" ranges from about 60 to about 90, preferably from about 70 to about 87 atomic percent. When the amount of Fe and Ni is increased above about 90 atomic percent, or decreased below about 60 atomic percent, the alloy becomes difficult to cast via melt quenching techniques, and the resulting product tends to exhibit inadequate soft magnetic properties. More particularly, below about 60 atomic % Fe and Ni there is too much metalloid present to produce a good soft magnetic material.

M is at least one metal selected from the group consisting of Mo, Cr, Hf, Nb, Ta, Ti, V, W, and Zr. M is preferably selected from the group Cr, Ta and Mo, and is most preferably Mo. The percent of M, represented by "b" in the above composition, is from about 0.1 to about 10 atomic % with from about 1.0 to about 8.0 being preferred, and from about 2.0 to about 4.0 atomic % being most preferred. As the atomic percentage decreases below about 2.0 atomic %, the nanocrystalline particles become more difficult to form during useful annealing conditions of the type described hereinafter. Alloys with more than 10 atomic % M are also difficult to cast via melt quenching techniques.

The percentage of metalloid (B and Si), which is represented by "c", is from about 0.1 to about 30 atomic percent, with from about 13 to about 30 atomic % being the preferred range. In particular, the atomic percentage of boron is from about 0.1 to about 30 atomic %, with from about 13 to about 22 atomic % being the preferred range, and from about 14 to about 18 atomic % being most preferred. As the atomic percentage of B is increased above the preferred about 22 atomic %, the volume percentage of boride tends to increase, thereby decreasing the volume percentage of the nanocrystalline phase, and correspondingly degrading the magnetic properties of the alloy. Further, amounts of boron in excess of about 22 atomic % tie up Fe and Ni in the amorphous phase, thus decreasing the amount of nanocrystalline particles which can form.

Within certain ranges Si facilitates formation of the crystallites by increasing the temperature difference between the first crystallization temperature, $T_{x1}$ and the second crystallization temperature $T_{x2}$. Si also aids in forming the amorphous phase, which is the precursor to the nanocrystalline phase of the alloy of the present invention. The range of Si (represented by "y" in the above formula) is from 0 up to about 0.5. Thus, Si ranges from 0 up to about 15 atomic %. Preferably Si, if present, is present in an amount up to about 10 atomic %, and most preferably in an amount up to about 5 atomic %.

The components are melted in the desired ratio and then cast, for example, by the planar flow casting technique disclosed in U.S. Pat. No. 4,221,257, incorporated herein by reference, to produce strips of amorphous metallic material.

After casting, the amorphous material is annealed at a temperature below the onset of the second crystallization temperature. Any temperature below the onset of the second crystallization temperature may be used; however, the lower the temperature, the longer the annealing time at that temperature. Accordingly, the temperature for the anneal is preferably above the onset of the first crystallization temperature. However, severe annealing conditions (excessive temperature, time or a combination thereof) result in the formation of a second crystalline phase, which degrades the overall soft magnetic properties of the resulting product. Accordingly, the alloy is preferably annealed at a temperature between the onset of the first crystallization temperature and the onset of the second crystallization temperature. Annealing temperatures which are near the midpoint between the onsets of the first and second crystallization temperatures yield the best harmonic properties, and are thus particularly preferred. For example, the alloy $Fe_{40}Ni_{38}Mo_4B_{18}$ displays a first crystallization temperature at 439° C. and a second crystallization temperature at 524° C. The midpoint between these two temperatures is 482° C. The preferred temperature range is from about 450° C. to about 490° C. and most preferably from about 470° C. to about 490° C.

The alloys of the present invention may be annealed without a field or under the influence of a longitudinal field. For no-field annealed alloys the annealing temperature is preferably below the midpoint of the first and second crystallization temperatures, and most preferably from about 10° C. to about 30° C. below said midpoint. For alloys annealed under the influence of a longitudinal field, the alloys are preferably annealed near said midpoint say within the range of ±10° C. from the midpoint. Alloys annealed in a longitudinal field display the highest harmonic outputs and are thus preferred. Preferably the longitudinal field is no greater than about 20 Oe, and most preferably about 10 Oe.

As stated above, the length of the anneal will vary depending upon the annealing temperature and field which are used. For the preferred range of annealing temperatures (between the onset of the first and second crystallization temperatures) the annealing time is preferably from about one half to about two hours, and most preferably from about one half hour to about one hour. The anneal is most preferably carried out in an inert atmosphere, such as nitrogen.

For the family of alloys wherein M is Mo, the nanocrystalline particles formed during the first step of the anneal exhibit essentially fcc crystal structure, and are made up essentially of NiFeMo crystals. These nanocrystalline particles are generally Ni-based and should not be allowed to grow to an effective particle size larger than about 100 nm, and preferably not larger than about 30 nm. Nanocrystalline particles with effective particle sizes of 10 nm or less are the most preferred. For alloys containing Mo, annealing at temperatures at or above the second crystallization temperature causes the formation of the second crystalline phase, which is boride based, and degrades the overall soft magnetic properties of the resulting product.

Because the alloys of the present invention are cast and then annealed, the alloy may be worked in the as-cast state in order to take advantage of generally better ductility.

Alloys annealed according to the process of the present invention yield markers which display greatly improved harmonic properties over alloy strips which have not been so annealed. The harmonic signal of the markers of the present invention may be further altered by changing the length, width or thickness of the marker. The markers of the present invention may be used in article surveillance systems which are commonly used with little or no modification to the system.

The following examples are meant to be illustrative, and not limiting. Various changes may suggest themselves to one skilled in the art. The true spirit and scope of the present invention should be determined by reference to the appended claims, and should not be limited by the following examples.

EXAMPLE 1

An alloy having the nominal composition $Fe_{40}Ni_{38}Mo_4B_{18}$ was cast via planar flow casting. The resulting alloy showed two onset of crystallization temperatures at 439° C. and 524° C. when heated in a Perkin Elmer DSC-2C Differential Scanning Calorimeter at a heat rate of 20° C./min. The first one corresponded to Ni—Fe—Mo phase and the second one corresponded to 6:23 boride phase. Five strips measuring 2⅜ inches by 1/16 inches cut along the ribbon length were annealed at each of the conditions listed in Table 1, below. The harmonic signal (amplitude of 15–18th harmonic) was measured at a frequency of 10 kHz and a drive field of 1.2 Oe. The average harmonic signal and standard deviation for each run is also listed in Table 1, below.

TABLE 1

| | OUTPUT VOLTAGE ($V_{pp}$) | |
|---|---|---|
| ANNEALING CONDITIONS | LONGITUDINAL FIELD ( 10 OE) | NO FIELD |
| AS-CAST | | .29 ± .02 (ave) |
| 440° C./30 MIN | .29 ± .07 | .35 ± .13 (ave) |
| 440° C./1 HR | .43 ± .08 | .30 ± .09 (ave) |
| 460° C./30 MIN | .40 ± .07 | .54 ± .15 (ave) |
| 460° C./1 HR | .29 ± .10 | .43 ± 0.11 (ave) |
| 480° C./30 MIN | .82 ± .44 | .48 ± 0.19 (ave) |
| 480° C./1 HR | .30 ± .16 | .18 ± .03 (ave) |
| 500/30 | .41 ± .21 | .30 ± .12 (ave) |
| 500/1 HR* | .15 ± .05 | .12 ± .04 (ave) |

TABLE 1-continued

| ANNEALING CONDITIONS | OUTPUT VOLTAGE ($V_{pp}$) | |
|---|---|---|
| | LONGITUDINAL FIELD (10 OE) | NO FIELD |
| 520/30** | 0 | 0 |
| 520/1 HR | 0 | 0 |

*one strip broke
**two strips broke

FIG. 1 shows a plot of harmonic signal as a function of annealing temperature. The signal of as-cast, amorphous strips is 0.29 $V_{pp}$ (designated as an open circle along the output axis). The average harmonic output for the markers annealed for an hour in a 10 Oe longitudinal field is shown by the line connecting open squares. The average harmonic output for the markers which were no-field annealed for one half hour are shown by the line connecting shaded squares. The average harmonic output for the markers which were annealed for one half hour in a 10 Oe longitudinal field is shown by the line connecting the crossed lines. The average harmonic output for the markers which were no-field annealed for one hour is shown by the line connecting the horizontal bars. The highest average harmonic signal of 0.82 $V_{pp}$ was measured on strips annealed at 480° C. for 30 min in a 10 Oe longitudinal field, a 183% increase in harmonic signal. All of the alloys annealed for one half hour between temperatures of 440° C. and 500° C., and the alloys annealed at low temperatures for one hour show improvement over non-annealed markers indicating the harmonic signal increases on going from amorphous to nanocrystalline state. At extreme annealing conditions (temperatures above 500° C. or excessive combinations of time and temperature) the harmonic signal decreases, indicating that the second crystalline phase has formed. The harmonic signal for alloys annealed between temperatures of 460° C. and 500° C. for 30 minutes in a 10 Oe field display harmonic outputs which are about 50% higher than the non-annealed alloys, and harmonic outputs for the alloys annealed between about 470° C. and 490° C. are about 100% higher than non-annealed alloys of the same composition. The suprising increase in harmonic output is achieved without the addition of copper and at annealing conditions which are generally less severe than those disclosed in the prior art.

I claim:

1. A process for enhancing the harmonic output of a marker comprising the steps of:
   providing an amorphous alloy having a composition $(Fe_{1-x}Ni_x)_aM_b(B_{1-y}Si_y)_c$ wherein "x" ranges from about 0.2 to about 0.9, "y" ranges from 0 up to about 0.5, "a" is between about 60 and about 90 atomic % "b" is between about 0.1 to about 10 atomic %, "c" is between about 0.1 to about 30 atomic percent, and M is at least one metal selected from the group consisting of Mo, Cr, Hf, Nb, Ta, Ti, V, W, and Zr, the amorphous alloy having at least two crystallization temperatures, a first crystallization temperature at which a nanocrystalline phase is formed, and a second crystallization temperature at which a second crystalline phase is formed;
   annealing the amorphous alloy at a temperature between the first and the second crystallization temperatures for a time sufficient to increase at least one harmonic characteristic of the marker.

2. The process of claim 1 wherein the amorphous alloy is a strip.

3. The process of claim 2 wherein the strip is annealed in the absence of an applied magnetic field.

4. The process of claim 2 wherein the strip is annealed at a temperature within 20° of a temperature which is midpoint between the first and the second crystallization temperatures.

5. The process of claim 4 where the alloy strip is annealed for a peroid of time from about one half hour to about one hour.

6. The process of claim 2 wherein the strip is annealed at a temperature within 10° of the temperature which is midpoint between the first and the second crystallization temperatures.

7. The process of claim 6 wherein said strip is annealed under the influence of an applied longitudinal magnetic field.

8. The process of claim 7 wherein said longitudinal field has a strength of about 10 Oe.

9. The process of claim 8 where the strip is annealed for a period of time between about one half hour to about one hour.

10. The process of claim 8 wherein "x" is between about 0.48 and about 0.9, "y" is between 0 and about 0.5, "a" is between about 70 and about 87 atomic percent, "b" is between about 1.0 to about 8.0, "c" is between about 13 and about 30 atomic %, and M is selected from the group Cr, Ta and Mo.

11. The process of claim 8 wherein "b" is about 2.0 to about 4.0 atomic % and M is Mo.

12. The process of claim 8 wherein the alloy has the nominal composition $Fe_{40}Ni_{38}Mo_4B_{18}$.

13. The process of claim 1 wherein said improved harmonic characteristic is harmonic output voltage.

14. A process for enhancing the harmonic output of a marker consisting essentially of:
   providing an amorphous alloy having a composition $(Fe_{1-x}Ni_x)_aM_b(B_{1-y}Si_y)_c$ wherein "x" ranges from about 0.2 to about 0.9, "y" ranges from 0 up to about 0.5, "a" is between about 60 and about 90 atomic % "b" is between about 0.1 to about 10 atomic %, "c", is between about 0.1 to about 30 atomic percent, and M is at least one metal selected from the group consisting of Mo, Cr, Hf, Nb, Ta, Ti, V, W, and Zr, the amorphous alloy having at least two crystallization temperatures, a first crystallization temperature at which a nanocrystalline phase is formed; and a second crystallization temperature at which a second crystalline phase is formed; annealing the amorphous alloy at temperature between the first and the second crystallization temperatures for a time sufficient to increase at least one harmonic characteristic of the marker.

* * * * *